United States Patent
Kim (10) Patent No.: US 9,607,488 B2
(45) Date of Patent: Mar. 28, 2017

(54) WEARABLE VEHICLE INFORMATION INDICATOR AND METHOD OF INDICATING VEHICLE INFORMATION USING THE SAME

(71) Applicant: Hyundai Motor Company, Seoul (KR)

(72) Inventor: Beom Sik Kim, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 89 days.

(21) Appl. No.: 14/611,445

(22) Filed: Feb. 2, 2015

(65) Prior Publication Data
US 2015/0254945 A1 Sep. 10, 2015

(30) Foreign Application Priority Data
Mar. 4, 2014 (KR) .................. 10-2014-0025335

(51) Int. Cl.
| | |
|---|---|
| *B60K 35/00* | (2006.01) |
| *G08B 5/36* | (2006.01) |
| *G06F 3/01* | (2006.01) |
| *B60Q 3/04* | (2006.01) |
| *G02B 27/01* | (2006.01) |

(52) U.S. Cl.
CPC .............. *G08B 5/36* (2013.01); *B60K 35/00* (2013.01); *B60Q 3/046* (2013.01); *G02B 27/01* (2013.01); *G02B 27/0172* (2013.01); *G06F 3/013* (2013.01)

(58) Field of Classification Search
CPC .. G02B 27/017; G02B 27/0172; G02B 27/01; G02B 27/0101; G60K 35/00; B60K 27/00; G06F 3/013
See application file for complete search history.

(56) References Cited

U.S. PATENT DOCUMENTS

| | | | | |
|---|---|---|---|---|
| 6,614,344 | B1 * | 9/2003 | Frasher ............... | B60N 2/0252 340/425.5 |
| 2007/0194902 | A1 * | 8/2007 | Blanco ............... | G01C 21/365 340/461 |

(Continued)

FOREIGN PATENT DOCUMENTS

| | | |
|---|---|---|
| JP | 2010-049383 A | 3/2010 |
| JP | 2010-149580 A | 7/2010 |

(Continued)

*Primary Examiner* — Thomas Alunkal
(74) *Attorney, Agent, or Firm* — Mintz Levin Cohn Ferris Glovsky and Popeo, P.C.; Peter F. Corless (57) ABSTRACT

A vehicle information indicator and a method of indicating vehicle information using the indicator are disclosed. The indicator is configured such that a driver who wears the indicator is capable of coordinating devices within a vehicle and can give commands to the coordinated devices. The indicator includes a coordinate setting module which designates a space within the vehicle as spatial coordinates, recognizes the distance of a change in line-of-sight of the user based on an eye zone, and designates a desired zone as detailed zone coordinates. A user command module recognizes a body motion pattern of the user and the number of times of the motion, or a direction and distance that the line-of-sight of the user moves, and provides commands to the devices. In addition, a wireless communication module provides wireless communication between the user command module and the vehicle. A battery is configured to supply power to the modules.

9 Claims, 8 Drawing Sheets

(56) References Cited

U.S. PATENT DOCUMENTS

| | | | | |
|---|---|---|---|---|
| 2010/0324779 A1* | 12/2010 | Takahashi | ............... | B60K 37/06 701/36 |
| 2012/0139816 A1* | 6/2012 | King | ........................ | B60Q 9/00 345/7 |
| 2013/0187845 A1* | 7/2013 | Madau | .................... | B60K 35/00 345/156 |
| 2015/0258997 A1* | 9/2015 | Nilsson | ................. | B60W 40/09 340/576 |

FOREIGN PATENT DOCUMENTS

| | | |
|---|---|---|
| JP | 2012-006552 A | 1/2012 |
| JP | 2013-027718 A | 2/2013 |
| KR | 10-2007-0043943 | 4/2007 |
| KR | 10-2008-0085256 | 9/2008 |
| KR | 10-2009-0130134 | 12/2009 |
| KR | 10-2012-0127790 A | 11/2012 |
| KR | 10-2013-0008979 | 1/2013 |

\* cited by examiner

WEARABLE VEHICLE INFORMATION INDICATOR AND METHOD OF INDICATING VEHICLE INFORMATION USING THE SAME

CROSS REFERENCE TO RELATED APPLICATION(S)

Pursuant to 35 U.S.C. §119(a), this application claims the benefit of Korean Application No. 10-2014-0025335, filed on Mar. 4, 2014, which is incorporated herein in its entirety.

BACKGROUND

Field of the Invention

The present invention relates to wearable vehicle information indicators and methods of indicating vehicle information using the indicators and, more particularly, to wearable vehicle information indicators which are configured such that a driver who wears the indicator is capable of coordinating a variety of devices within a vehicle and is able to give operation commands to the coordinated devices, and methods of indicating vehicle information using the indicator.

Description of the Related Art

Generally, instrument clusters installed in front of a driver seat are used for providing a variety of vehicle information to drivers. In addition, different types of methods of enabling drivers to more easily and rapidly recognize a variety of information regarding the vehicle have been developed.

Recently, Google Glass, (which is a glasses-shaped smart device), has been introduced. Google Glass may be used to operate a variety of application programs in conjunction with a smart phone. Google Glass includes a headset shaped like a pair of glasses and includes a computer, an imaging device (i.e., a camera, video camera, etc.), a prism type display, a microphone, a speaker, a battery, etc. Furthermore, Google Glass has a five megapixel imaging device, a video function, an 802.11 b/g WiFi function, a Bluetooth function, etc. and is operated by voice or touch recognition methods. However, Google Glass has no function for coordinating different devices in one space. Furthermore, due to the display being disposed in front of the eyes of a user, when a user wears Google Glass when driving, images displayed may reduce driving attentiveness.

SUMMARY

Accordingly, the present invention provides a wearable vehicle information indicator configured such that a driver who wears the indicator may coordinate a variety of devices within a vehicle, and may also provide operation commands to the coordinated devices while the indicator may periodically recognize the line-of-sight of the driver or determine whether motion of the driver matches a preset pattern. The present invention further provides a method of indicating vehicle information using the indicator and a computer program for the same.

In one aspect, the present invention provides a vehicle information indicator configured to be worn in front of the eyes of a user. The vehicle information indicator may include a coordinate setting module configured to set a space within a vehicle as a plurality of spatial coordinates, recognize a distance of a change in a line-of-sight movement of the user based on an eye zone as a reference point of the spatial coordinates, and set a particular zone from the spatial coordinates as detailed zone coordinates; a user command module configured to recognize one of a pattern of body motion of the user and frequencies that the motion is preformed or a direction and distance that the line-of-sight of the user moves, and communicate operation commands to at least one device within the vehicle; a wireless communication module configured to execute wireless communication between the user command module and the vehicle; and a battery configured to supplying power to the modules.

The coordinate setting module may include: a gyro- or acceleration sensor configured to sense a change in the line-of-sight of the user; an input module configured to input a point at which the line-of-sight movement of the user has stopped; and a controller configured to recognize the point input by the input module as a coordinate value. The input module may include one of a timer configured to measure a time for which the line-of-sight movement of the user has stopped and a touch pad configured to receive direct input of the point.

In another aspect, the present invention provides a method of indicating vehicle information using a vehicle information indicator, which may include: setting a particular spatial area in a vehicle as a plurality of spatial coordinates; recognizing, by a controller, a distance change in a line-of-sight movement of a user based on an eye zone which may be a reference point of the spatial coordinates of the indicator, and setting, by the controller, a particular zone from the spatial coordinates as detailed zone coordinates; transmitting, by the controller, an operation command signal of the user to a desired device of the vehicle via wireless communication when a direction and distance that the line-of-sight of the user has moved is matched with the desired device. The method may further include operating, by the controller, the desired device in response to the transmitted operation command signal.

The method may yet further include recognizing, by the controller, a pattern of body motion of the user and frequencies that the motion is performed (e.g., the number of times the body motion is performed) as a detailed operation command signal for the desired device while the desired device is operated; and selecting, by the controller, a menu item of the desired device in response to the detailed operation command signal. In addition, the method may include displaying, on a display within the vehicle, operation information regarding the desired device in response to transmission of the operation command signal of the user, to the desired device via wireless communication; and warning the driver, by a warning indicator executed by the controller, in response to the line-of-sight of the driver being out of the eye zone for a predetermined time.

Further, the method may include: analyzing, by the controller, a location of the eye zone of the indicator, a line-of-sight pattern for setting the coordinates, and the pattern of the body motion for the operation command, and identifying the user; transmitting a user identification signal to the vehicle; and automatically adjusting, by the controller, at least one of a position of a steering wheel, a position of a seat and a position of at least one side mirror in response to the user identification signal.

As described above, the present invention may have the following effects.

First, a user may obtain vehicle information with a glasses-type indicator, worn by the user, without space restriction. As needed, the user who wears the indicator may operate the vehicle. Since manipulation of a menu related to operating the vehicle using a sensor may be possible, the indicator may free both of the driver's hands while the driver is manipulating the menu, thus enhancing convenience of use.

Second, the indicator according to exemplary embodiments of the present invention may be worn on the face of the user and provide information to the user in response to variation of the line-of-sight of the user. Therefore, the present invention may reduce dangers which may result from manipulating vehicle controls, (e.g., switches or knobs), while driving, thus promoting safer driving. Furthermore, the indicator may rapidly provide vehicle information to the user, thereby reducing traffic accident risks.

Third, the indicator according to exemplary embodiments of the present invention may be in wireless communication with the vehicle, whereby devices (such as an imaging device, e.g., a camera, a video camera, etc., a display, etc.) of the vehicle may be used as the indicator without a need for a separate imaging device or display installed in the indicator. As a result, the weight of the indicator may be reduced, and the indicator may be manufactured at relatively low costs.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a controller. The memory is configured to store the modules and the controller is specifically configured to execute said modules to perform one or more processes which are described further below.

Furthermore, control logic of the present invention may be embodied as non-transitory computer readable media on a computer readable medium containing executable program instructions executed by a controller, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

A storage device is understood to refer to any medium capable of storing processes or data, in any form, and may for example, include hard drives, memory, smart cards, flash drives, etc. The memory is configured to store the modules and the controller is specifically configured to execute said modules to perform one or more processes which are described further below.

Specific structural and functional descriptions of exemplary embodiments of the present invention disclosed herein are only for illustrative purposes of the exemplary embodiments of the present invention. The present invention may be embodied in many different forms without departing from the spirit and significant characteristics of the present invention. Therefore, the exemplary embodiments of the present invention are disclosed only for illustrative purposes and should not be construed as limiting the present invention.

Reference will now be made in detail to various exemplary embodiments of the present invention, examples of which are illustrated in the accompanying drawings. The suffixes "module" and "unit" of elements herein are used for convenience of description and thus can be used interchangeably and do not have any distinguishable meanings or functions.

Although all elements constituting the exemplary embodiments of the present invention are described to be integrated into a single element or to be operated as a single element, the present invention is not necessarily limited to such embodiments. According to exemplary embodiments, all of the elements may be selectively integrated into one composite structure or more and be operated as one or more composite structures within the object and the scope of the present invention. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily reasoned by those skilled in the art to which the present invention pertains. The computer program may be stored in a computer readable medium such that the computer program is read and executed by one or more computers to implement embodiments of the present invention. Computer program storage media may include magnetic recording media, optical recording media, carrier wave media, or the like.

It will be understood that, although the terms "first", "second", "A", "B", "(a)", "(b)", etc. may be used herein to describe various elements of the present invention, these terms are only used to distinguish one element from another element and essential, order, or sequence of corresponding elements are not limited by these terms. Hereinafter, exemplary embodiments of the present invention will be described in detail with reference to the attached drawings.

In the present invention an indicator may be worn as glasses and may be used to coordinate a variety of devices within a vehicle, and may be provided with operation commands for the coordinated devices. Accordingly, the indicator ma the configured to periodically recognize the line-of-sight of the driver or determine whether motion of the driver matches a preset pattern.

The indicator according to the present invention is a device which may have a similar shape to that of optical glasses or the like, however the invention is not limited only to devices having a glasses shaped structure, rather all types of structures are contemplated, so long as the user (driver) may be able to wear, remove and see through the device when the device is being worn.

Figure 1:
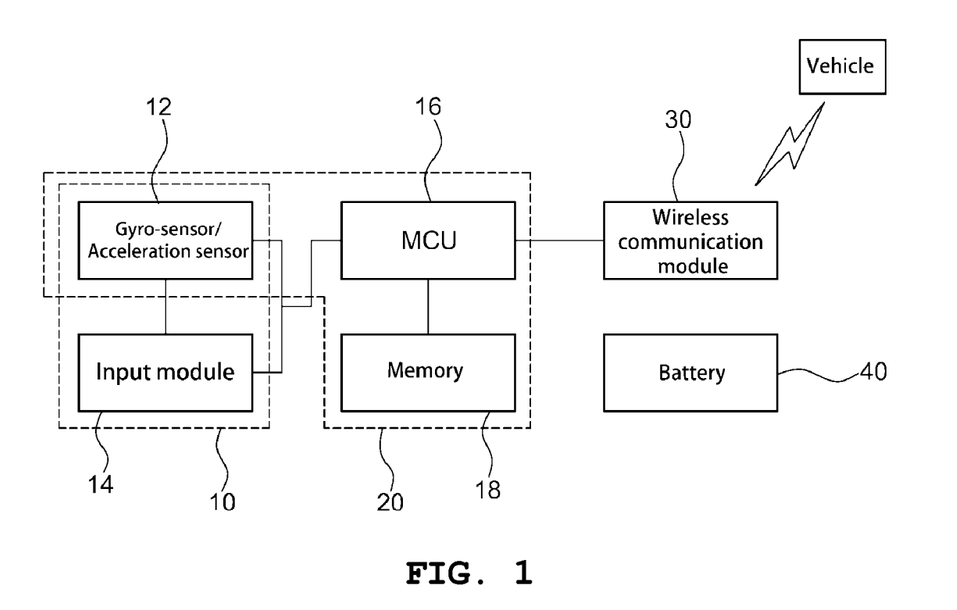
FIG. 1 is an exemplary block diagram showing modules installed in a vehicle information indicator according to an exemplary embodiment of the present invention.

FIG. 1 is an exemplary block diagram showing modules installed within a vehicle information indicator according to exemplary embodiments of the present invention. The indicator according to the present invention may have a lens, a frame that supports the lens, and a leg portion. The indicator may include, in the frame and the leg portion, a coordinate setting system 10 which may be configured to recognize particular spaces and designate such spaces as coordinates, a user command system 20 which may be configured to recognize body motion, line-of-sight, etc. of a user and transmit operation orders to various devices within the vehicle, a wireless communication device 30 which may be configured to execute wireless communication between the user command system 20 and the vehicle. Also shown is a battery 40 which may be configured to supply power to the modules. The coordinate setting system 10, the user command system 20 and the wireless communication device may be executed by a controller or by a plurality of controllers, (e.g., one or more computer-implemented processors).

The coordinate setting system 10 may be configured set the space within the vehicle as spatial coordinates. Furthermore, the coordinate setting system 10 may be configured to recognize a distance of a change in line-of-sight of a user based on an eye zone that is a reference point of the spatial coordinates, and set desired zones from the spatial coordinates as detailed zone coordinates. Accordingly, the coordinate setting system 10 may include a gyro- or acceleration sensor 12 which may be configured to sense a change in line-of-sight of the user (e.g., by sensing movement of the head of the user when the user's line-of-sight changes), an input module 14 which may be configured to input a point at which the line-of-sight movement of the user temporarily stops (e.g., for several seconds), and a controller 16 (e.g., an automotive microcontrol unit—MCU—) which may be configured to recognize the point, input in the input module 14, as one coordinate value.

According to exemplary embodiments, the input module 14 may use a timer which may be disposed within the indicator and may be configured to measure an amount of time for which the line-of-sight movement of the user is stopped. Furthermore, the input module 14 may include a switch or touch pad which may be provided on the leg portion of the indicator to enable the user to directly input the point.

Figure 2:
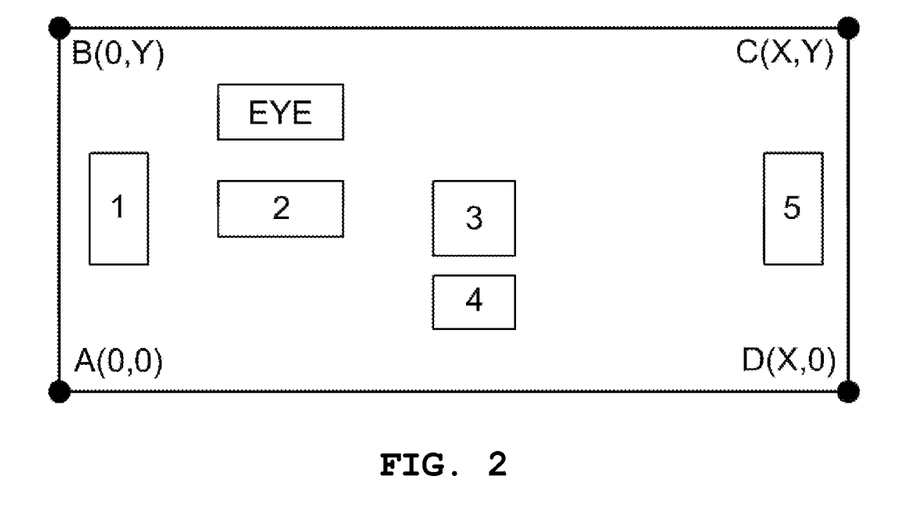
FIGS. 2 and 3 are exemplary schematic views illustrating a process of setting spatial coordinates of the vehicle information indicator and detailed zone coordinates according to an exemplary embodiment of the present invention.
Figure 3:
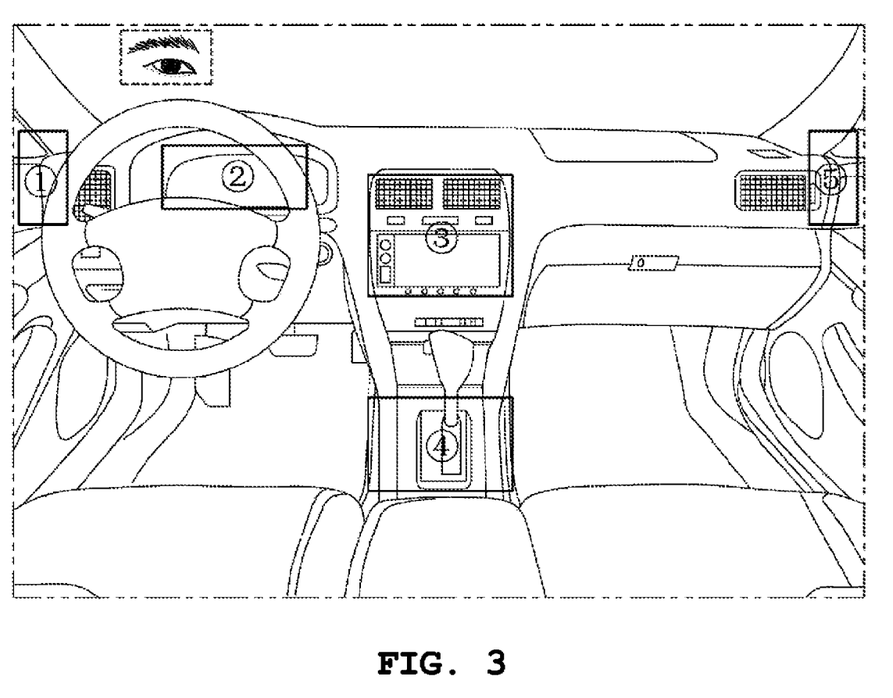
Figure 4:
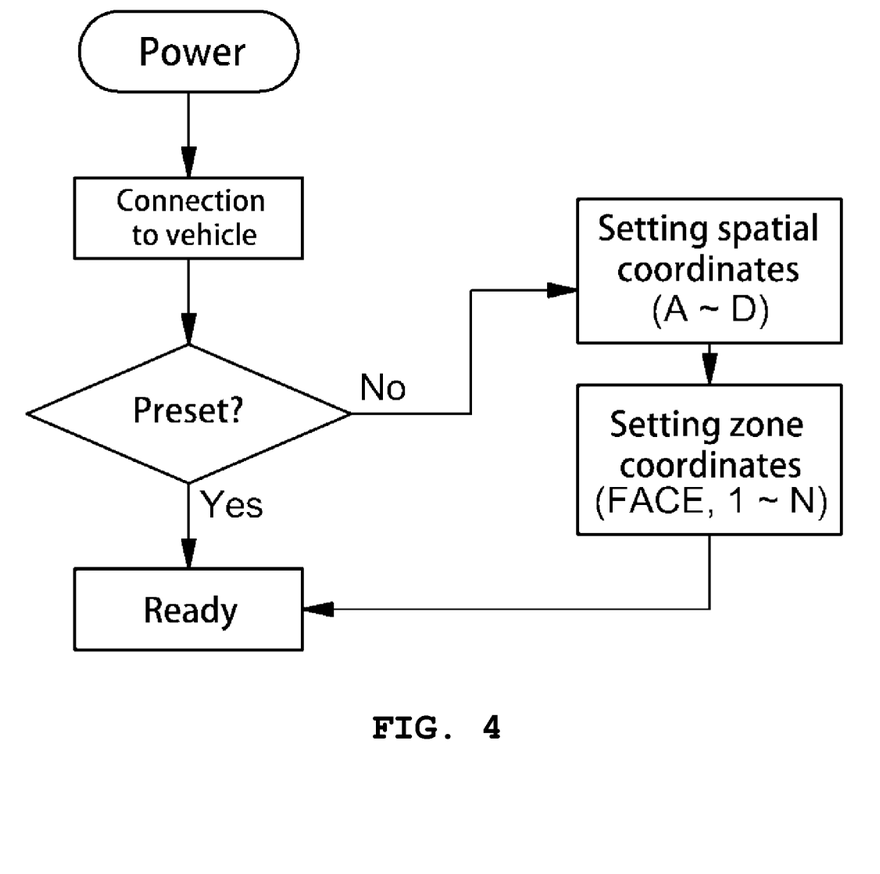
FIG. 4 is an exemplary flowchart showing a process of setting the spatial coordinates and the detailed zone coordinates of the vehicle information indicator according to an exemplary embodiment of the present invention.

Hereinafter, a method of indicating vehicle information using the indicator having the above-mentioned construction will be described. FIGS. 2 and 3 are exemplary schematic views illustrating a process of setting spatial coordinates of the vehicle information indicator and detailed zone coordinates according to exemplary embodiments of the present invention. First, when the user turns on the indicator, the indicator may be configured to automatically load initialization and user information from a memory 18 and may be in wireless communication with the vehicle via the wireless communication device 30. Thereafter, the indicator may be configured to conduct a preset operation in which user-customized coordinate zones may be set.

The preset operation may include a spatial coordinate setting operation and an operation of setting detailed zone coordinates from the set spatial coordinates. The spatial coordinate setting operation, in which the user who wears the indicator may coordinate a particular spatial area within the vehicle, may be conducted first. For example, as shown in FIG. 2, a specific space (e.g., the interior space of the vehicle) may be coordinated as A (0,0), B (0,Y), C (X,Y), D (X,0), etc. and thus defined as spatial coordinates. As show in FIG. 3, the interior space (e.g., including left and right side mirrors based on when the driver is facing forward, a steering wheel, a center fascia, etc.) of the vehicle is present in the exemplary, defined single spatial coordinates.

Subsequently, in the operation of setting detailed zone coordinates, particular zones of No. 1 to No. N in the spatial coordinates may be set as detailed zone coordinates to determine a distance of a change in line-of-sight of the user, based on the eye zone as the reference point of the spatial coordinates. For example, as shown in FIG. 2, based on the eye zone as the reference point of the spatial coordinates, the line-of-sight of the user may successively move to No. 1 (the left side mirror), No. 2 (a cluster), No. 3 (an audio, visual and navigation—AVN—system), No. 4 (a gearshift) and No. 5 (the right side mirror). In particular, when measuring a time that movement of the driver's line-of-sight is stopped at each zone and such measured time is equal to or greater than a predetermined time period, or when the user directly inputs a signal using the input module, each of the zones of No. 1 to No. 5 may be set as a detailed zone coordinate.

After the preset operation is completed, (e.g., in the above-described way), the indicator worn on the user may become ready to be operated. In particular, to operate various devices recognized as the detailed zone coordinates in the spatial coordinates, the user command system 20 in the indicator may be configured to recognize the direction and distance that the line-of-sight of the user has moved. When the direction and distance that the line-of-sight of the user moves are matched with a specific device in the detailed zone coordinates, an operation command signal of the user may be transmitted to a corresponding, specific device via wireless communication. Then, the specific device may be operated by a transmitted operation command signal.

While the specific device is operated, a pattern of body motion and the number of times of motion (e.g., the motion of turning the head up, down, left and right and the number of times the user performs a turning motion) may be recognized as detailed operation command signals for the specific device. Accordingly, the operation menu items of the specific device may be selectively conducted by the detailed operation command signals. Furthermore, when an operation command signal of the user is transmitted to a specific device of the vehicle via wireless communication and the specific device is thus operated by the operation command signal, operation information of the specific device may be simultaneously displayed on a display within the vehicle by the AVN controller. Accordingly, the driver may operate a desired device without separately manipulating the desired device with his or her hands. As a result, driving stability may be enhanced.

Hereinafter, several exemplary embodiments of the method of indicating vehicle information using the vehicle information indicator according to the exemplary embodiments of the present invention will be described.

First Exemplary Embodiment

Figure 5:
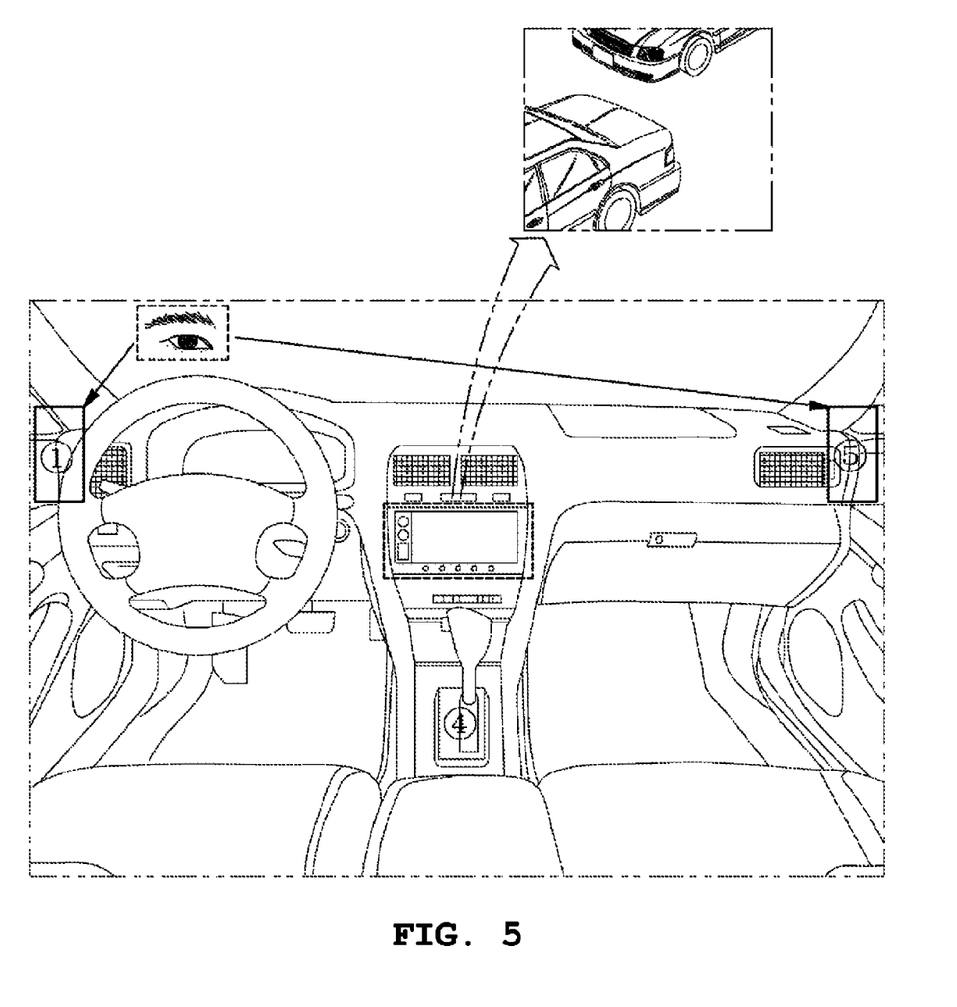
FIGS. 5 through 9 are exemplary views showing a method of indicating vehicle information using the indicator according to exemplary embodiments of the present invention.

Referring to FIG. 5, when the user having a line-of-sight in the eye zone of the indicator turns his or her line-of-sight to the zone of No. 1 (the left side mirror) and the zone of No. 5 (the right side mirror) and returns the line-of-sight to the front, that is, the eye zone, the user command system 20 of the indicator may be configured to instruct the AVN system to display imaging device images of the corresponding side mirrors. Then, images of the corresponding side mirrors displaying the rear of the vehicle may be displayed on a head up display (HUD), a cluster liquid crystal display (LCD), a display of the AVN system or the like, thus enabling the user to change lanes and recognize road driving conditions.

Second Exemplary Embodiment

Figure 6:
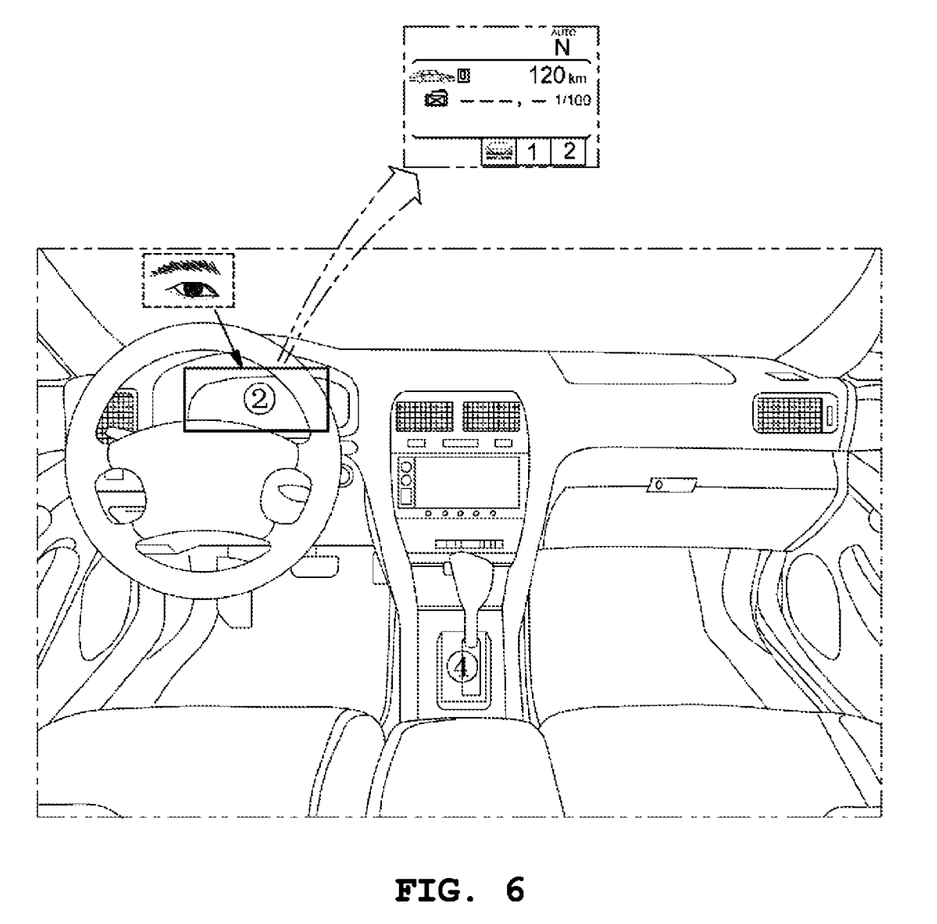

Referring to FIG. 6, when the user having a line-of-sight in the eye zone of the indicator turns to the zone of No. 2 (the cluster zone) and returns the line-of-sight to the front, a screen which enables the user to read vehicle information may be displayed on the HUD to allow the user to more easily read the vehicle information while driving. Furthermore, when an LCD is present in the cluster, the indicator may be configured to recognize a body motion pattern and the number of times a given motion (e.g., motion of turning the head up, down, left and right and the number of times the user performs such turns) is performed. Such motions may be recognized as detailed operation command signals for manipulating menu items indicated on the LCD to allow the vehicle information menu items which may be displayed on the LCD to be selected using a body motion manipulation.

Third Exemplary Embodiment

Figure 7:
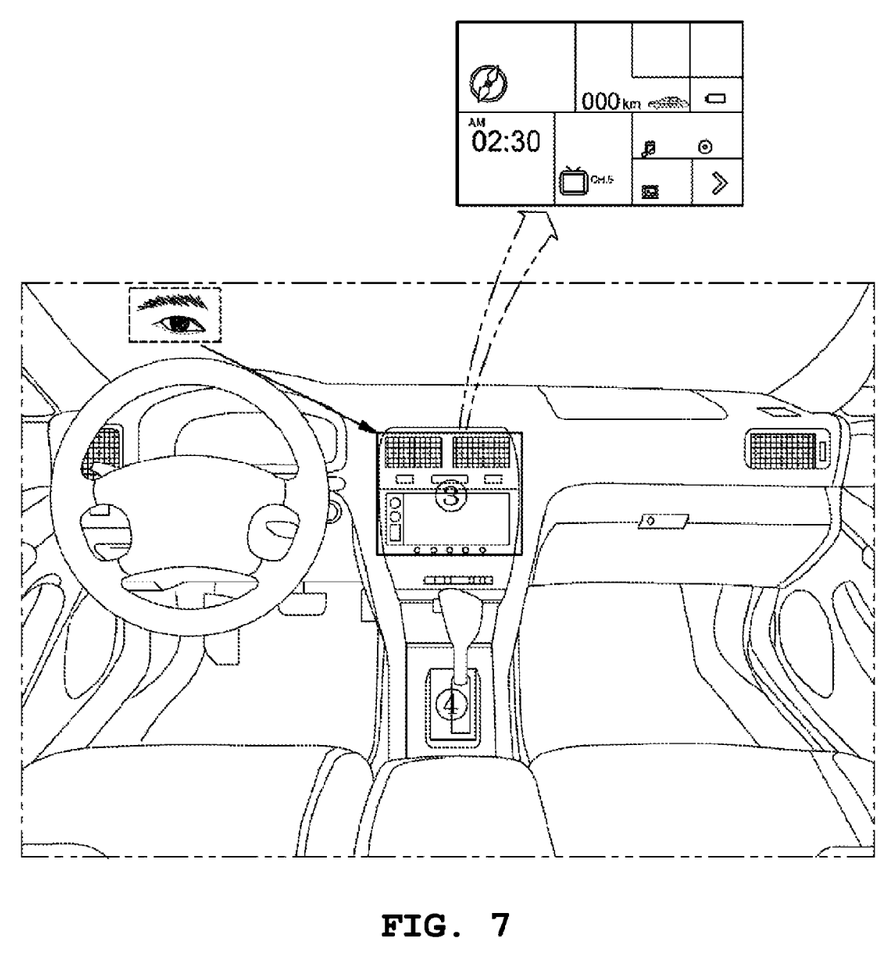

Referring to FIG. 7, when the user having a line-of-sight in the eye zone of the indicator turns to the zone of No. 3 (the AVN system) and returns the line-of-sight to the front, menu items for manipulating the AVN system may be displayed. The user may then manipulate the menu items to select a desired item using a head turning motion. In other words, after the menu items are displayed on a display screen in response to the operation of the AVN system, a pattern of body motion of the user and the number of times a motion (e.g., the motion of turning the head up, down, left and right and the number of times the user turns his or her head) may be recognized as detailed operation command signals for manipulating the menu items of the AVN system. Accordingly, the menu items of the AVN system may be manipulated.

Fourth Exemplary Embodiment

Figure 8:
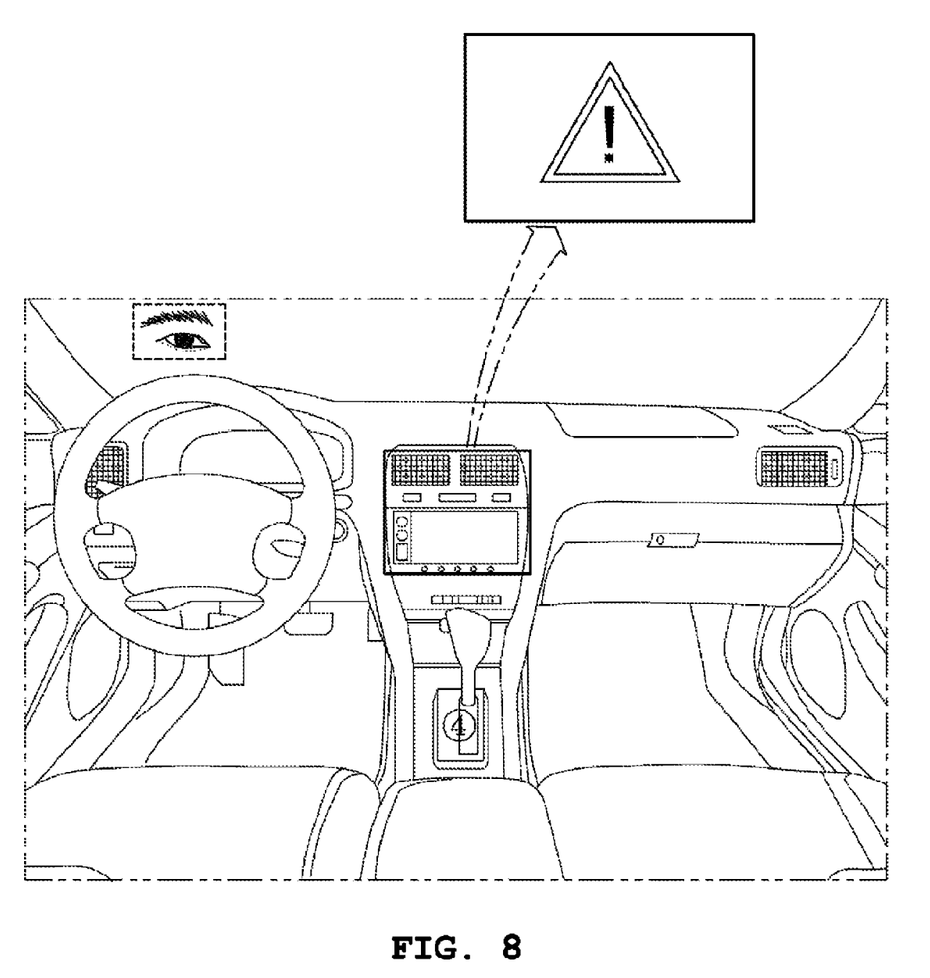

Referring to FIG. 8, when the line-of-sight of the driver is out of (e.g., beyond) the eye zone for a predetermined amount of time, the user may be regarded as being drowsy or driving in a dangerous state and a warning message along with a warning sound may displayed to the user, thus promoting safe driving.

Fifth Exemplary Embodiment

Figure 9:
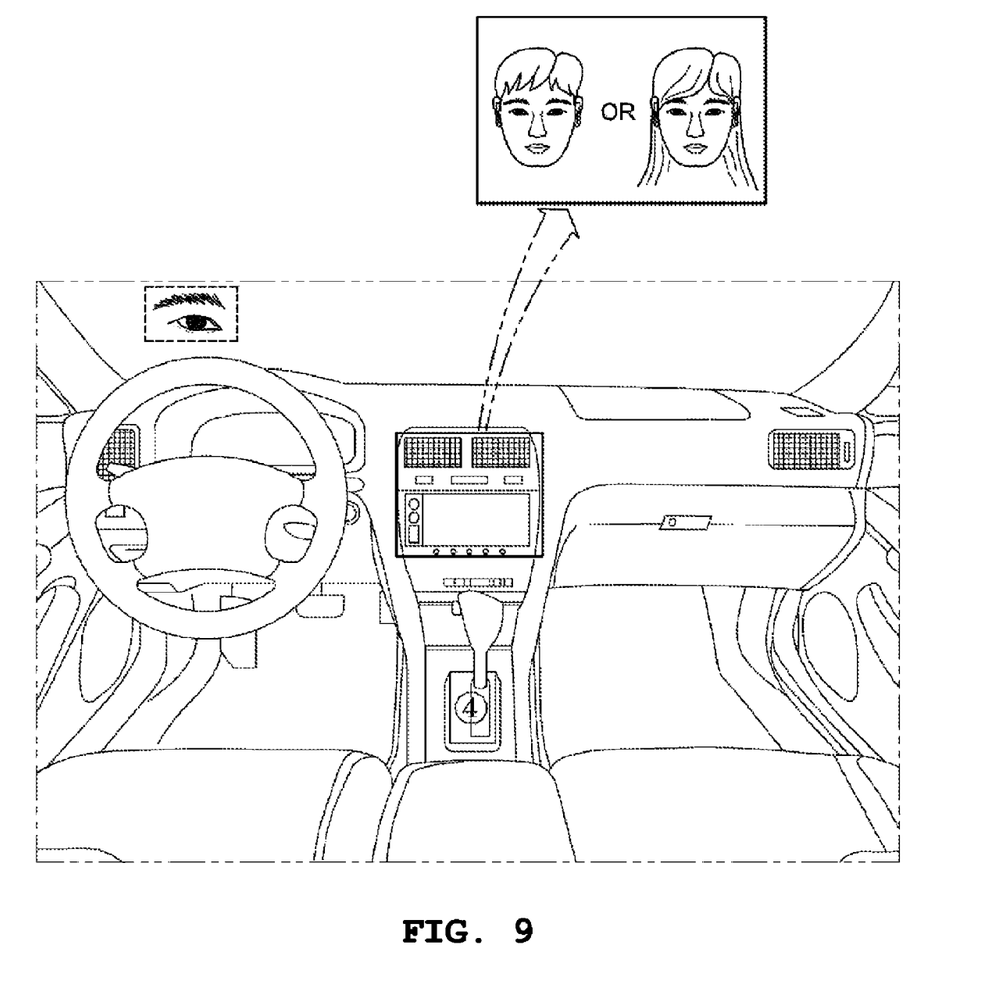

Referring to FIG. 9, the indicator may be configured to analyze the location of the eye zone of the user, a line-of-sight pattern for setting coordinates and a body motion pattern for operation commands, identify the user, and transmit a user identification signal to the vehicle. Then, depending on the user identification signal, the positions of the steering wheel, the driver's seat and at least one side mirror may be automatically adjusted, if appropriate, thus enhancing convenience of use.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of indicating vehicle information using a vehicle information indicator, the method comprising:
   receiving, by a controller, a user setting corresponding to a plurality of spatial coordinates within a particular spatial area within a vehicle;
   recognizing, by the controller, a distance of a change in a line-of-sight movement of a user based on an eye zone as a reference point of the plurality of spatial coordinates of the indicator, and
   setting, by the controller, a particular zone from the plurality of spatial coordinates as detailed zone coordinates;
   transmitting, by the controller, of an operation command signal of the user to a desired device of the vehicle via wireless communication when a direction and distance that the line-of-sight of the user has moved is matched with the desired device;
   analyzing, by the controller, a location of the eye zone of the indicator, a line-of-sight pattern for setting the coordinates, and the body motion pattern for the operation command, to identify the user;
   transmitting, by the controller, a user identification signal to the vehicle; and
   automatically adjusting, by the controller, a position of the desired device in response to the user identification signal.

2. The method as set forth in claim 1, further comprising:
   operating, by the controller, the desired device in response to the transmitted operation command signal.

3. The method as set forth in claim 1, further comprising:
   recognizing, by the controller, a body motion pattern of the user and frequencies that the motion is performed as a detailed operation command signal for the desired device while the desired device is operated; and
   selecting, by the controller, a detailed menu item of the desired device in response to the operation command signal.

4. The method as set forth in claim 1, further comprising displaying, by the controller, on a display within the vehicle, operation information of the desired device in response to transmission of the operation command signal of the user, to the desired device via wireless communication.

5. The method as set forth in claim 1, further comprising warning the user, by the controller configured to operate a warning indicator, in response to the line-of-sight of the user being out of the eye zone for a determined time.

6. A non-transitory computer readable medium containing program instructions executed by a controller, the computer readable medium comprising:
- program instructions for receiving, by a controller, a vehicle information indicator a user setting corresponding to a plurality of spatial coordinates within a particular spatial area within a vehicle;
- program instructions for recognizing, by the controller, a distance of a change in a line-of-sight movement of a user based on an eye zone as a reference point of the plurality of spatial coordinates of the indicator, and setting, by the controller, a particular zone from the spatial coordinates as detailed zone coordinates;
- program instructions for transmitting, by the controller, an operation command signal of the user to a desired device of the vehicle via wireless communication when a direction and distance that the line-of-sight of the user has moved is matched with the desired device;
- program instructions for analyzing, by the controller, a location of the eye zone of the indicator, a line-of-sight pattern for setting the coordinates, and the body motion pattern for the operation command, to identify the user;
- program instructions for transmitting, by the controller, a user identification signal to the vehicle; and
- program instructions for automatically adjusting, by the controller, a position of the desired device in response to the user identification signal.

7. The non-transitory computer readable medium of claim 6, further comprising:
- program instructions that recognize, by the controller, a body motion pattern of the user and frequencies that the motion is performed as a detailed operation command signal for the desired device while the desired device is operated; and
- program instructions that select, by the controller, a menu item of the desired device in response to the operation command signal.

8. The non-transitory computer readable medium of claim 6, further comprising:
- program instructions that display, by the controller, on a display within the vehicle, operation information of the desired device in response to transmission of the operation command signal of the user, to the desired device via wireless communication.

9. The non-transitory computer readable medium of claim 6, further comprising:
- program instructions that warn the user, by the controller configured to operate a warning indicator, in response to the line-of-sight of the user being out of the eye zone for a determined time.

* * * * *